United States Patent [19]

Bacchi et al.

[11] Patent Number: 5,741,113
[45] Date of Patent: Apr. 21, 1998

[54] CONTINUOUSLY ROTATABLE MULTIPLE LINK ROBOT ARM MECHANISM

[75] Inventors: Paul Bacchi, Novato; Paul S. Filipski, Greenbrae, both of Calif.

[73] Assignee: Kensington Laboratories, Inc., Richmond, Calif.

[21] Appl. No.: 499,963

[22] Filed: Jul. 10, 1995

[51] Int. Cl.$^6$ .................................................. B25J 9/06
[52] U.S. Cl. .................. 414/744.5; 414/935; 414/744.6; 901/17
[58] Field of Search .................. 414/935, 744.1, 414/744.4, 744.5, 744.6; 901/17

[56] References Cited

U.S. PATENT DOCUMENTS

| | | | |
|---|---|---|---|
| 4,065,001 | 12/1977 | Ohnaka | 214/1 BV |
| 4,299,533 | 11/1981 | Ohnaka | 414/752 |
| 4,457,664 | 7/1984 | Judell et al. | 414/779 |
| 4,511,985 | 4/1985 | Inoba et al. | 901/17 |
| 4,728,252 | 3/1988 | Lada et al. | 414/744 |
| 4,897,015 | 1/1990 | Abbe et al. | 414/744.8 |
| 4,938,654 | 7/1990 | Schram | 198/394 X |
| 5,007,784 | 4/1991 | Genov et al. | 414/225 |
| 5,046,992 | 9/1991 | Tamai et al. | 474/84 |
| 5,054,991 | 10/1991 | Kato | 414/783 |
| 5,064,340 | 11/1991 | Genov et al. | 414/744.5 |
| 5,083,896 | 1/1992 | Uehara et al. | 414/744.5 |
| 5,102,280 | 4/1992 | Poduje et al. | 414/225 |
| 5,125,791 | 6/1992 | Volovich | 198/394 X |
| 5,151,008 | 9/1992 | Ishida et al. | 414/744.5 |
| 5,178,512 | 1/1993 | Skrobak | 414/744.5 |
| 5,308,222 | 5/1994 | Bacchi et al. | 414/783 |
| 5,314,294 | 5/1994 | Taniguchi et al. | 414/744.6 |
| 5,331,458 | 7/1994 | Bacchi et al. | 359/393 |
| 5,332,352 | 7/1994 | Poduje et al. | 414/225 |
| 5,382,806 | 1/1995 | Bacchi et al. | 250/561 |
| 5,513,946 | 5/1996 | Sawada et al. | 414/744.5 |
| 5,584,647 | 12/1996 | Uehara et al. | 414/744.5 |

FOREIGN PATENT DOCUMENTS

| | | | |
|---|---|---|---|
| 0065859 | 1/1982 | European Pat. Off. | B25J 9/00 |
| 9104138 | 4/1991 | WIPO | B25J 9/06 |

OTHER PUBLICATIONS

Kensington Laboratories, Inc., Product Advertisement Brochure, including pocket information sheet for 3 Link Wafer Handler, Jul. 20, 1993.

Data Sheet for Kensington Laboratories WH-3 Wafer Handler Robot Mechanism (1986).

Drawing figure showing motor arrangement implemented in WH-3 mechanism.

IBM Technical Disclosure Bulletin, vol. 31, No. 10, Mar. 1989, "Dual Microscope Semiconductor Wafer Inspection Station".

*Primary Examiner*—Karen B. Merritt
*Assistant Examiner*—Gregory A. Morse
*Attorney, Agent, or Firm*—Stoel Rives LLP

[57] ABSTRACT

A multiple link robot arm mechanism uses first and second motors capable of synchronized operation to permit movement of the robot arm hand along a curvilinear path as the extension of the hand changes. A motor controller controls the first and second motors in two preferred operational states to enable the robot arm mechanism to perform two principal motion sequences. The first operational state maintains the position of the first motor and rotates the second motor so that the mechanical linkage causes linear displacement (i.e., extension or retraction) of the hand. The second operational state rotates the first and second motors so that a mechanical linkage causes angular displacement of the hand about a shoulder axis. The second operational state can provide an indefinite number of travel paths for the hand, depending on coordination of the control of the first and second motors. An alternative preferred embodiment of the robot arm mechanism substitutes for the hand an end effector structure that has two oppositely extending hands and rotates about a wrist axis. All rotary joints of either embodiment are preferably fitted with rotary fluid slip rings or multiple fluid-passageway spools that permit continuous rotation about any of three axes.

16 Claims, 10 Drawing Sheets

CONTINUOUSLY ROTATABLE MULTIPLE LINK ROBOT ARM MECHANISM

TECHNICAL FIELD

The present invention relates to robot arm mechanisms and, in particular, to a continuously rotatable multiple link robot arm mechanism.

BACKGROUND OF THE INVENTION

Currently available robot arm mechanisms include pivotally joined multiple links that are driven by a first motor and are mechanically coupled to effect straight line movement of an end effector or hand and are equipped with a second, independently operating motor to angularly displace the hand about a central axis. Certain robot arm mechanisms are equipped with telescoping mechanisms that move the hand also in a direction perpendicular to the plane of straight line movement and angular displacement of the hand. The hand is provided with a vacuum outlet that secures a specimen, such as a semiconductor wafer, computer hard disk, or compact disk, to the hand as it transports the specimen between processing stations.

U.S. Pat. No. 4,897,015 of Abbe et al. describes a rotary-to-linear motion robot arm that uses a first motor to control a multi-linkage robot arm to produce straight line radial motion from motor-driven rotary motion. An additional motor may be coupled to the robot arm for operation independent of that of the first motor to angularly move the multi-linkage robot arm without radial motion. Because they independently produce radial motion and angular motion, the first and second motors produce useful robot arm movement when either one of them is operating.

The robot arm of the Abbe et al. patent extends and retracts an end effector (or a hand) along a straight line path by means of a mechanism that pivotally couples in a fixed relationship a first arm (or forearm) and a second (or upper) arm so that they move in predetermined directions in response to rotation of the upper arm. To achieve angular displacement of the hand, a θ drive motor rotates the entire robot arm structure. The Abbe et al. patent describes no capability of the robot arm to travel along any path other than a straight line or a circular segment defined by a fixed radius.

U.S. Pat. No. 5,007,784 of Genov et al. describes a robot arm with an end effector structure that has two oppositely extending hands, each of which is capable of picking up and transporting a specimen. The end effector structure has a central portion that is centrally pivotally mounted about the distal end of a second link or forearm. The extent of pivotal movement about all pivot axes is purposefully limited to prevent damage to vacuum pressure flexible conduits resulting from kinking or twisting caused by over-rotation in a single direction.

The coupling mechanism of a first link or upper arm, the forearm, and the end effector structure of the robot arm of the Genov et al. patent is more complex than that of the robot arm of the Abbe et al. patent. Nevertheless, the robot arm structures of the Abbe et al. and Genov et al. patents operate similarly in that each of the end effector structures picks up and transports specimens by using one motor to extend and retract a hand and another, different motor to rotate the entire robot arm structure to allow the hand to extend and retract at different ones of a restricted number of angular positions.

Robot arms of the type described by the Abbe et al. and Genov et al. patents secure a specimen to the hand by means of vacuum pressure delivered to the hand through fluid conduits extending through the upper arm, forearm, and hand and around all of the pivot axes. The Abbe et al. patent is silent about a vacuum pressure delivery system, and the Genov et al. patent describes the use of flexible fluid conduits. The presence of flexible fluid conduits limits robot arm travel path planning because unidirectional robot arm link rotation about the pivot axes "winds up" the conduits and eventually causes them to break. Thus, conduit breakage prevention requirements prohibit continuous robot arm rotation about any of the pivot axes and necessitate rewind maneuvers and travel path "lockout" spaces as part of robot arm travel path planning. The consequences of such rewind maneuvers are more complex and limited travel path planning, reduced throughput resulting from rewind time, and reduced available work space because of the lockout spaces.

SUMMARY OF THE INVENTION

An object of the invention is, therefore, to provide a multiple link robot arm mechanism that has straight line motion and continuous bidirectional rotation capabilities for transporting specimens to virtually any location in an available work space that is free of lockout spaces.

Another object of the invention is to provide such a mechanism that increases specimen processing throughput in the absence of a robot arm rewind time requirement.

A further object of this invention is to provide such a mechanism that is capable of continuous rotation in either direction with no susceptibility to kinking, twisting, or breaking of conduits delivering vacuum pressure to the hand.

Still another object of the invention is to provide such a mechanism that uses two motors capable of synchronous operation and a linkage coupling mechanism that permit the hand to change its extension as the robot arm mechanism changes its angular position.

The present invention is a multiple link robot arm mechanism that uses two motors capable of synchronized operation to permit movement of the robot arm hand along a curvilinear path as the extension of the hand changes. A first motor rotates a forearm about an elbow axis that extends through distal and proximal ends of the upper arm and forearm, respectively, and a second motor rotates an upper arm about a shoulder axis that extends through a proximal end of the upper arm. A mechanical linkage couples the upper arm and the forearm. The mechanical linkage forms an active drive link and a passive drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

In two embodiments described in detail below, a motor controller controls the first and second motors in two preferred operational states to enable the robot arm mechanism to perform two principal motion sequences. The first operational state maintains the position of the first motor and rotates the second motor so that the mechanical linkage causes linear displacement (i.e., extension or retraction) of the hand. The second operational state rotates the first and second motors so that the mechanical linkage causes angular displacement of the hand about the shoulder axis. The second operational state can provide an indefinite number of travel paths for the hand, depending on coordination of the control of the first and second motors.

Whenever the first and second motors move equal angular distances, the angular displacement of the upper arm about the shoulder axis and the angular displacement of the forearm about the elbow axis equally offset and thereby result in only a net angular displacement of the hand about the shoulder axis. Thus, under these conditions, there is no linear displacement of the hand and no rotation of the hand about the wrist axis. Whenever the first and second motors move different angular distances, the angular displacement of the upper arm about the shoulder axis and the angular displacement of the forearm about the elbow axis only partly offset and thereby result in angular displacements of the hand about the shoulder and wrist axes and consequently a linear displacement of the hand. Coordination of the position control of the first and second motors enables the robot arm mechanism to describe a compound curvilinear path of travel for the hand.

The robot arm mechanism is equipped with rotary fluid slip rings acting as fluid feedthrough conduits. These slip rings permit the hand to rotate continuously in a single direction as the robot arm links rotate continuously about the shoulder, elbow, and wrist axes without a need to unwind to prevent kinking or twisting of fluid pressure lines. Vacuum pressure is typically delivered through the fluid pressure lines.

An alternative preferred embodiment of the robot arm mechanism substitutes for the hand an end effector structure that has two oppositely extending hands and rotates about the wrist axis. This alternative embodiment maximizes specimen processing throughput within a working space of minimum area. Alternative rotary multiple fluid-passageway spools separately deliver fluid pressure to each rotary joint and permit continuous rotation of the robot arm links in a single direction about the shoulder, elbow, and wrist axes.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1A:
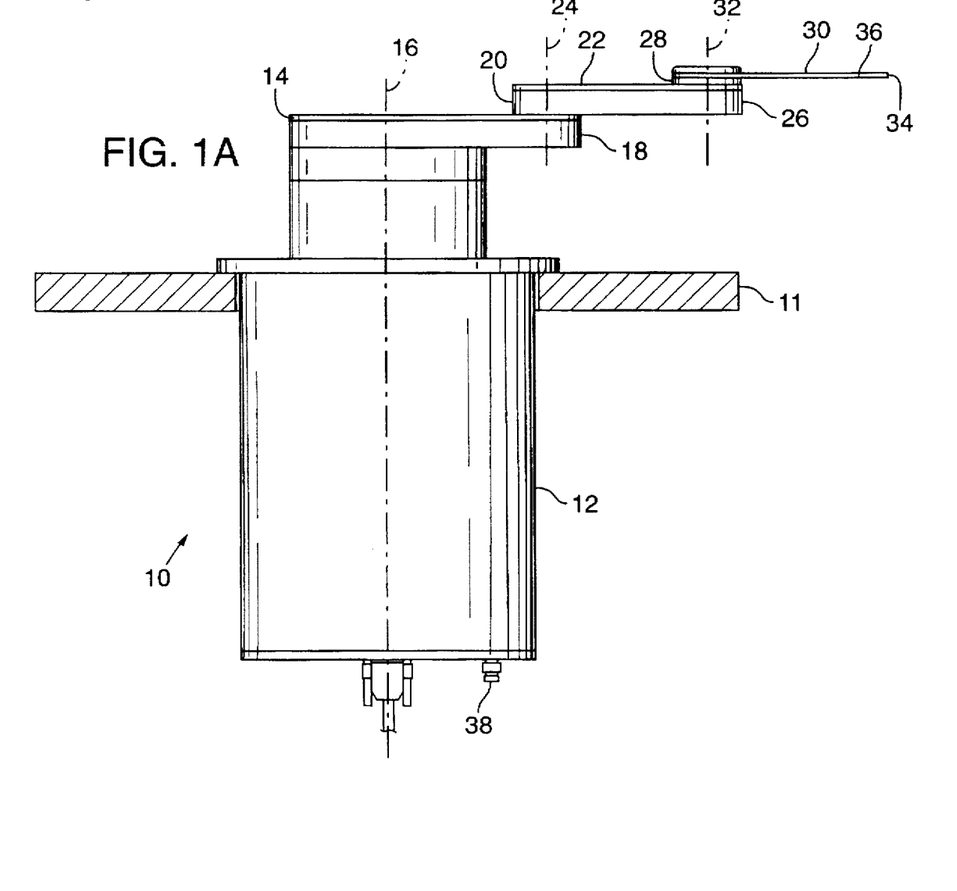
FIGS. 1A and 1B are respective side elevation and plan views of a three-link robot arm mechanism of the present invention.
Figure 1B:
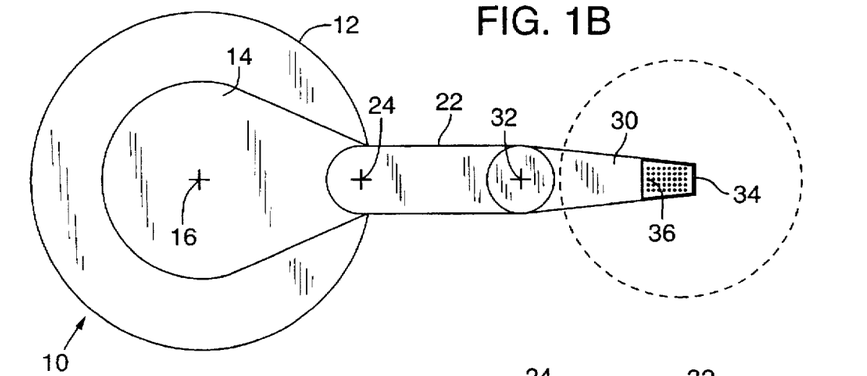

FIGS. 1A and 1B are respective side elevation and plan views of a three-link robot arm mechanism 10 mounted on and through an aperture in the top surface of a support table 11. With reference to FIGS. 1A and 1B, robot arm mechanism 10 comprises a base housing 12 to which an upper arm 14 is mounted for rotation about a shoulder axis 16. Upper arm 14 has a distal end 18 to which a proximal end 20 of a forearm 22 is mounted for rotation about an elbow axis 24, and forearm 22 has a distal end 26 to which a proximal end 28 of an end effector structure comprising a hand 30 is mounted for rotation about a wrist axis 32. Hand 30 is equipped at its distal end 34 with a fluid pressure outlet 36 that preferably applies vacuum pressure supplied to robot arm mechanism 10 at an inlet 38 to securely hold a semiconductor wafer, compact disk, or other suitable specimen (not shown) in place on hand 30. As will be described in detail later, each of upper arm 14, forearm 22, and hand 30 is capable of continuous rotation about its respective shoulder axis 16, elbow axis 24, and wrist axis 32.

Figure 2:
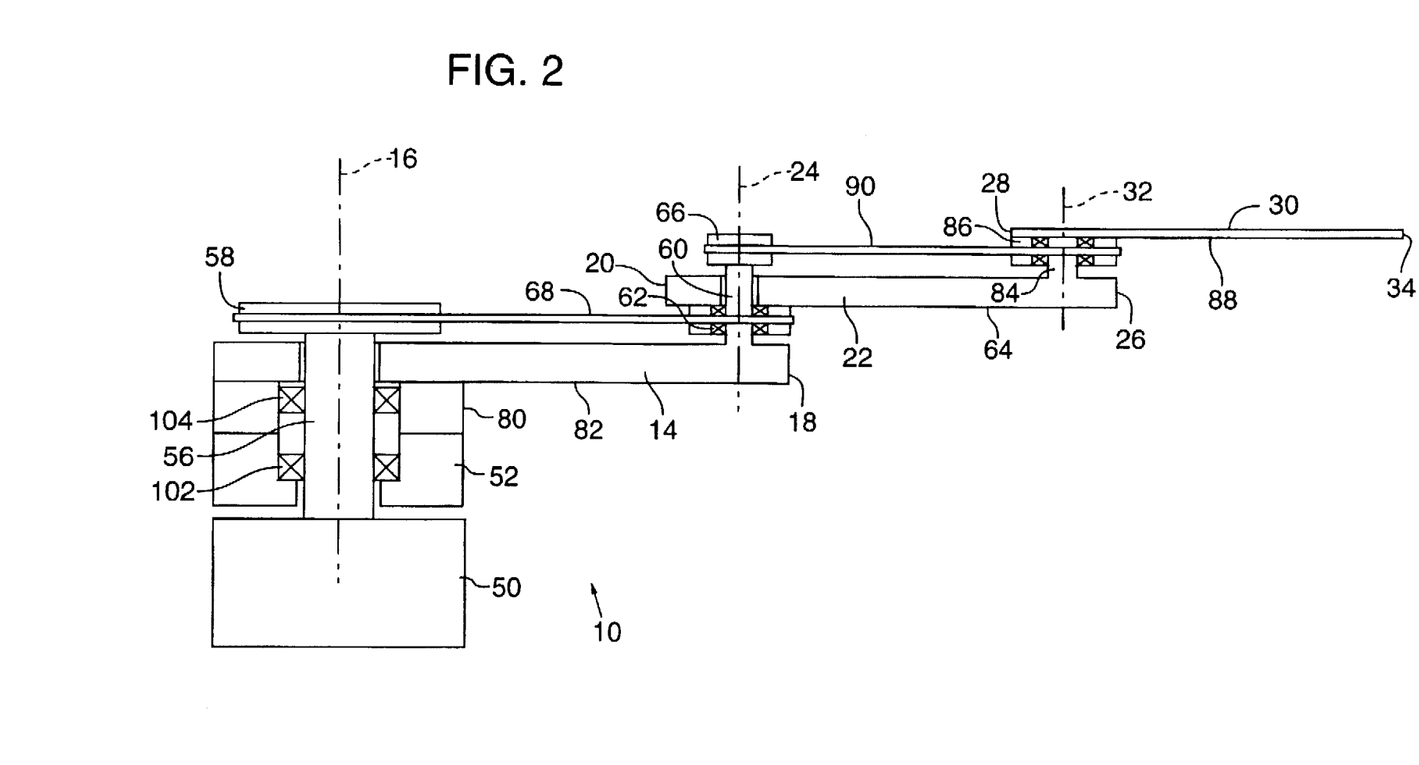
FIG. 2 is a side elevation view in stick diagram form showing the link components and the associated mechanical linkage of the robot arm mechanism of FIGS. 1A and 1B.
Figure 6A:
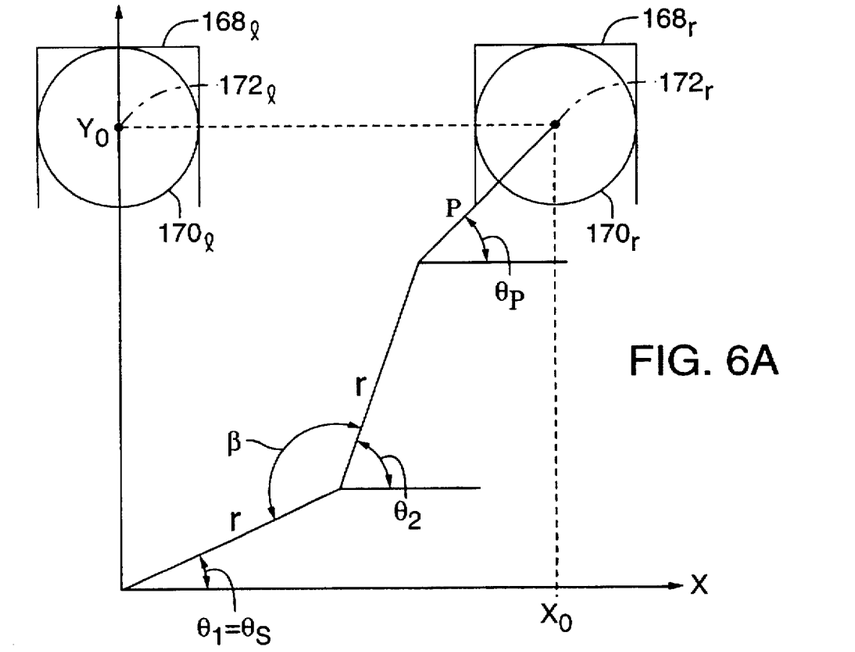
FIG. 6A is a diagram showing the spatial relationships and parameters that are used to derive the control signals provided by, and FIG. 6B is a block diagram of, the motor controller for the embodiments of the three-link robot arm mechanism of the invention.
Figure 6B:
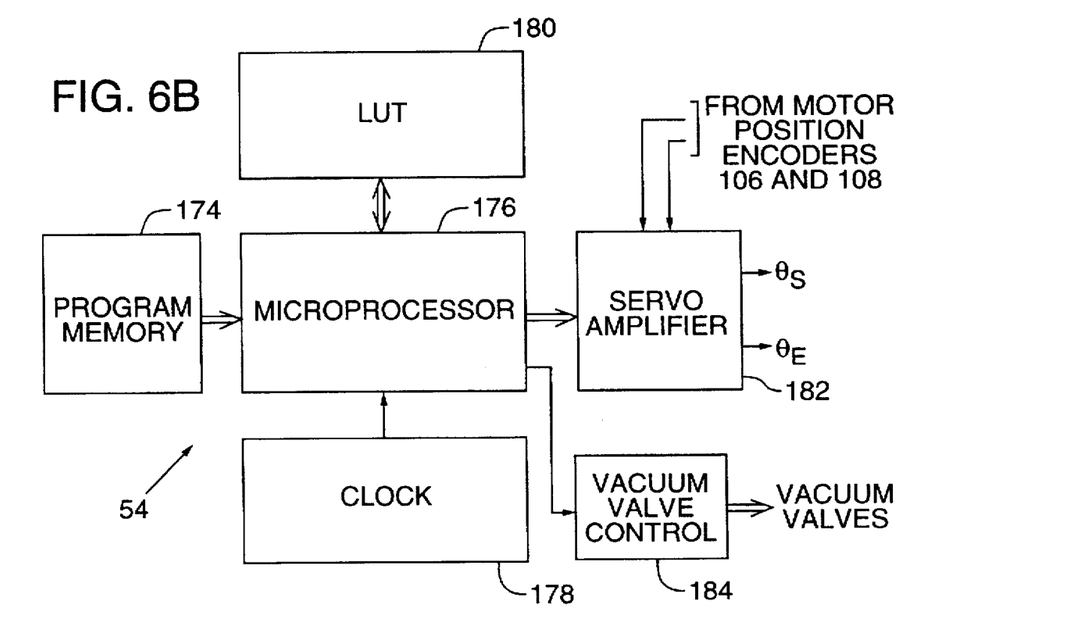

FIG. 2 shows the link components and associated mechanical linkage of robot arm mechanism 10. With reference to FIG. 2, robot arm mechanism 10 is positioned by first and second concentric motors 50 and 52 that operate in response to commands provided by a motor controller 54 (FIGS. 6A and 6B). First motor 50 rotates forearm 22 about elbow axis 24, and second motor 52 rotates upper arm 14 about shoulder axis 16.

More specifically, first motor 50 rotates a forearm spindle 56 that extends through an aperture in upper arm 14 and terminates in an upper arm pulley 58. A post 60 extends upwardly at distal end 18 of upper arm 14 through the center of a bearing 62 that is mounted to a bottom surface 64 of forearm 22 at its proximal end 20. Post 60 also extends through an aperture in forearm 22 and terminates in a forearm pulley 66. An endless belt 68 connects upper arm pulley 58 and the outer surface of bearing 62 to rotate forearm 22 about elbow axis 24 in response to rotation of first motor 50.

Second motor 52 rotates an upper arm spindle 80 that is mounted to a bottom surface 82 of upper arm 14 to rotate upper arm 14 about shoulder axis 16. Coordinated operation of first and second motors 50 and 52 in conjunction with the mechanical linkage described below causes hand 30 to rotate about shoulder axis 16. A post 84 extends upwardly through the center of a bearing 86 that is mounted to a bottom surface 88 of hand 30. An endless belt 90 connects forearm pulley 66 to the outer surface of bearing 86 to rotate hand 30 about shoulder axis 16 in response to the coordinated rotational motions of motors 50 and 52.

The mechanical linkage coupling upper arm 14 and forearm 22 forms an active drive link and a passive drive link. The active drive link includes belt 68 connecting upper arm pulley 58 and the outer surface of bearing 62 and causes forearm 22 to rotate in response to rotation of first motor 50. The passive drive link includes belt 90 connecting forearm pulley 66 and the outer surface of bearing 86 and causes hand 30 to rotate about wrist axis 32 in response to rotation of forearm 22 about elbow axis 24. Rotation of hand 30 can also be caused by a complex interaction among the active and passive drive links and the rotation of upper arm 14 in response to rotation of second motor 52.

Figure 3:
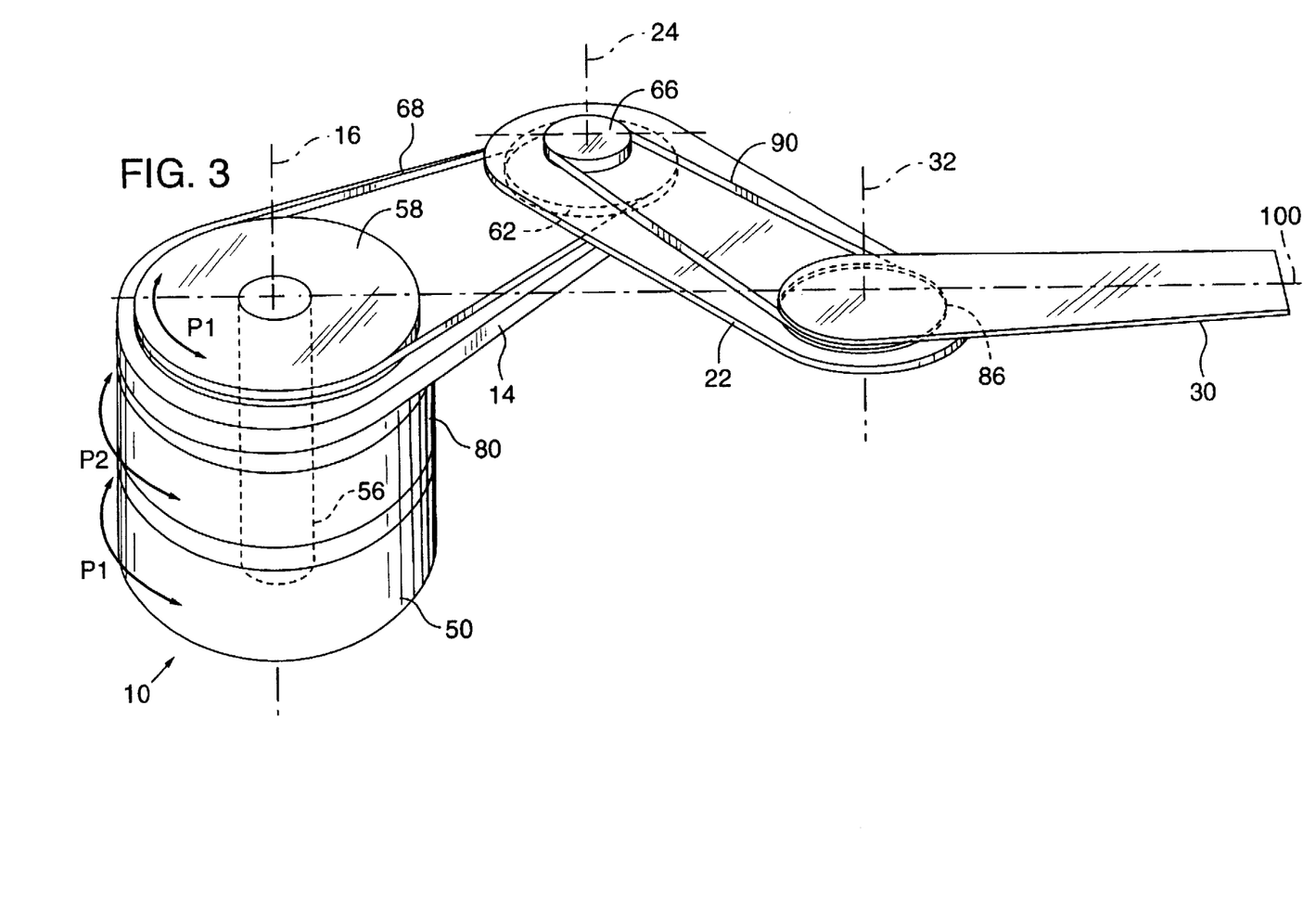
FIG. 3 is an isometric view in stick diagram form showing the rotational motion imparted by the motor drive links of the mechanical linkage of the robot arm mechanism of FIGS. 1A and 1B.

Motor controller 54 (FIGS. 6A and 6B) controls motors 50 and 52 in two preferred operational states to enable robot arm mechanism 10 to perform two principal motion sequences. The first motion sequence changes the extension or radial position of hand 30, and the second motion sequence changes the angular position of hand 30 relative to shoulder axis 16. FIG. 3 is a useful diagram for showing the two motion sequences.

With reference to FIGS. 2 and 3, in the first operational state, motor controller 54 causes first motor 50 to maintain the position of forearm spindle 56 and second motor 52 to rotate upper arm spindle 80. The non-rotation of first motor 50 maintains the position of upper arm pulley 58, and the rotation of upper arm spindle 80 by second motor 52 rotates upper arm 14 about shoulder axis 16, thereby causing rotation of forearm 22 about elbow axis 24 and counter-rotation of hand 30 about wrist axis 32. Because the ratio of the diameters of upper arm pulley 58 and the outer surface of bearing 62 are 4:2 and the ratio of the diameters of forearm pulley 66 and the outer surface of bearing 86 is 1:2, the rotation of upper arm 14 in a direction specified by $P_2$ shown in FIG. 3 will cause hand 30 to move along a straight line path 100. (The diameters of forearm pulley 66 and the outer surface of bearing 86 are one-half of the diameters of, respectively, the outer surface of bearing 62 and upper arm pulley 58 to streamline the sizes and shapes of forearm 22 and hand 30.)

Whenever upper arm 14 rotates in the clockwise direction specified by $P_2$, hand 30 extends (i.e., increases radial distance from shoulder axis 16) along path 100. Whenever upper arm 14 rotates in the counter-clockwise direction specified by $P_2$, hand 30 retracts (i.e., decreases radial distance from shoulder axis 16) along path 100. Skilled persons will appreciate that robot arm mechanism 10 in a mirror image configuration of that shown in FIG. 3 would extend and retract in response to upper arm 14 rotations in directions opposite to those described.

In the second operational state, motor controller 52 causes first motor 50 to rotate forearm spindle 56 in the direction specified by $P_1$ and second motor 52 to rotate upper arm spindle 80 in the direction specified by $P_2$. In the special case in which motors 50 and 52 are synchronized to rotate in the same direction by the same amount of displacement, hand 30 is only angularly displaced about shoulder axis 16. This is so because the rotation of forearm 22 about elbow axis 24 caused by the rotation of first motor 50 and the rotation of hand 30 about wrist axis 32 caused by rotation of second motor 52 and the operation of the passive drive link offset each other to produce no net rotation about elbow axis 24 and wrist axis 32. Thus, hand 30 is fixed radially at a point along path 100 and describes a circular path as only upper arm 14 rotates about shoulder axis 16. By application of kinematic constraints to achieve a desired travel path for hand 30, motor controller 54 can operate first and second motors 50 and 52 to move robot arm mechanism 10 along non-radial straight line paths, as will be further described below.

Skilled persons will appreciate that to operate robot arm mechanism 10, first and second motors 50 and 52 are coupled by either rotating both of them or grounding one while rotating the other one.

For example, robot arm mechanism 10 can be operated such that forearm 22 rotates about elbow axis 24. Such motion would cause hand 30 to describe a simple spiral path between shoulder axis 16 and the full extension of hand 30. This motion is accomplished by fixing the position of shoulder 14 and operating motor 50 to move forearm 22. Applicants note that the prior art described above is incapable of rotating the elbow joint without also rotating the shoulder joint, thereby requiring the operation of two motors.

Figures 4A, 4B:
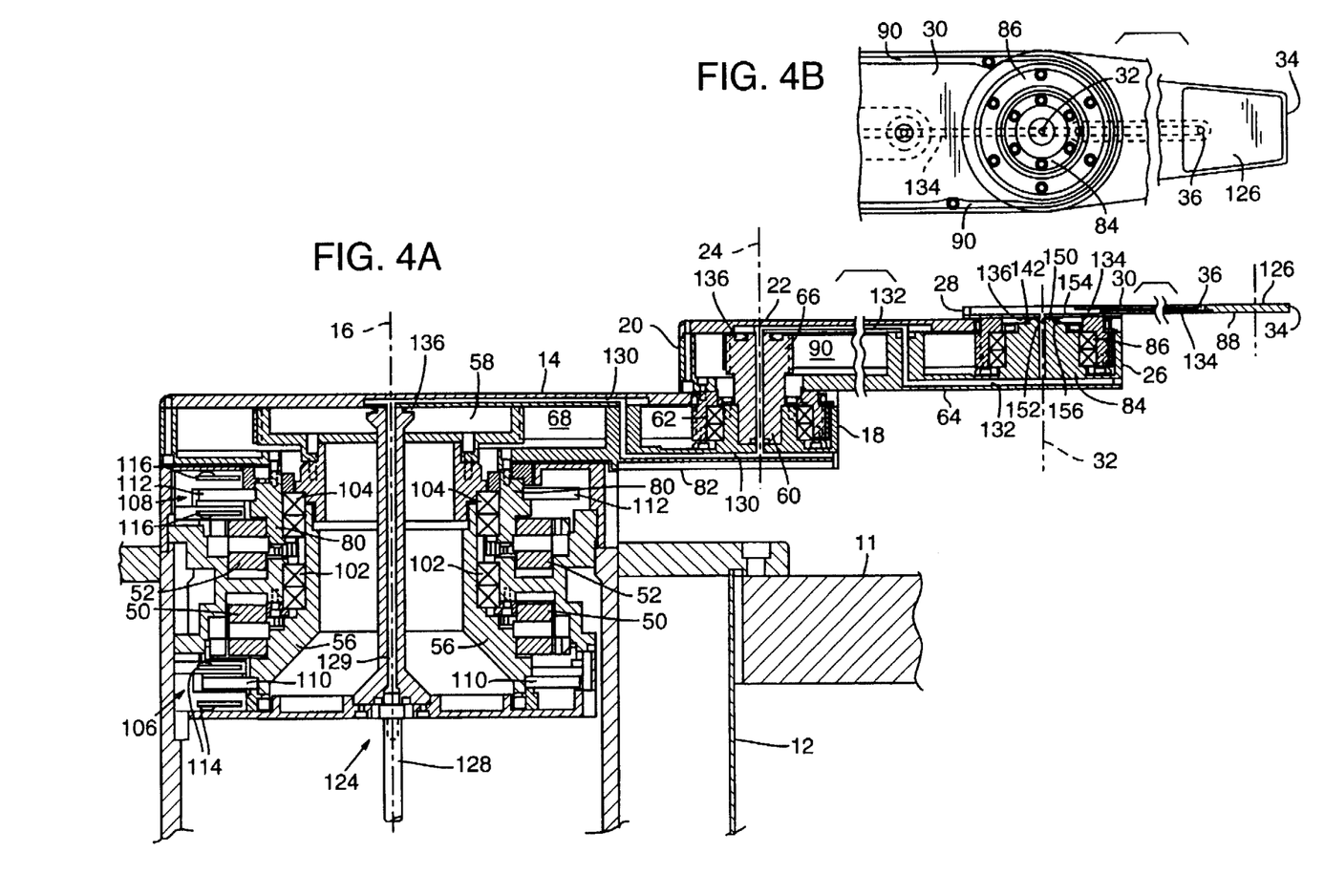
FIGS. 4A and 4B are respective cross-sectional and fragmentary plan views showing the interior components, mechanical linkage, and fluid pressure line paths of the robot arm mechanism of FIGS. 1A and 1B.

FIGS. 4A and 4B show the interior components, mechanical linkage, and fluid pressure conduits of robot arm mechanism 10 shown in FIGS. 1A and 1B. With reference to FIGS. 4A and 4B, base housing 12 contains first motor 50 and second motor 52 arranged in concentric relation such that their respective forearm spindle 56 and upper arm spindle 80 rotate about shoulder axis 16. Forearm spindle 56 is positioned nearer to shoulder axis 16 and is directly connected to upper arm pulley 58 journalled for rotation on bearings 102. Upper arm spindle 80 is positioned farther radially from shoulder axis 16 and is directly connected to bottom surface 82 of upper arm 14 journalled for rotation on bearings 104. The angular positions of motors 50 and 52 are tracked by respective glass scale encoders 106 and 108. Encoders 106 and 108 include respective annular diffraction grating scales 110 and 112 and respective light source/detector subassemblies 114 and 116. Such glass scale encoders are known to skilled persons.

A fluid pressure conduit 124 includes multiple path segments extending from inlet 38 in base housing 12 to a fluid pocket or land 126 in hand 30. In the preferred embodiments described, the fluid pressure conduits deliver vacuum pressure but are capable of delivering positive amounts of fluid pressure. Path segment 128 in base housing 12 is a flexible hose. Path segments 129, 130, 132, and 134 in the respective base housing 12, upper arm 14, forearm 22, and hand 30 are either channels formed by complementary depressions in mating components or holes passing through solid components. Outlet 36 constitutes a hole in vacuum land 126 on the specimen-contacting surface of hand 30. Each path segment terminating or originating at shoulder axis 16, elbow axis 24, and wrist axis 32 includes a rotary fluid slip ring 136 that functions as a vacuum feedthrough conduit that permits continuous rotation about any one of these three axes.

Figure 5A:
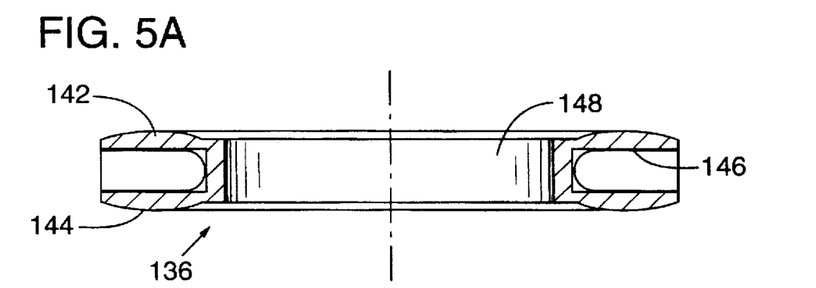
FIGS. 5A and 5B are respective side elevation and plan views of a rotary fluid slip ring installed at each rotary joint of the robot arm mechanism of FIGS. 1A and 1B.
Figure 5B:
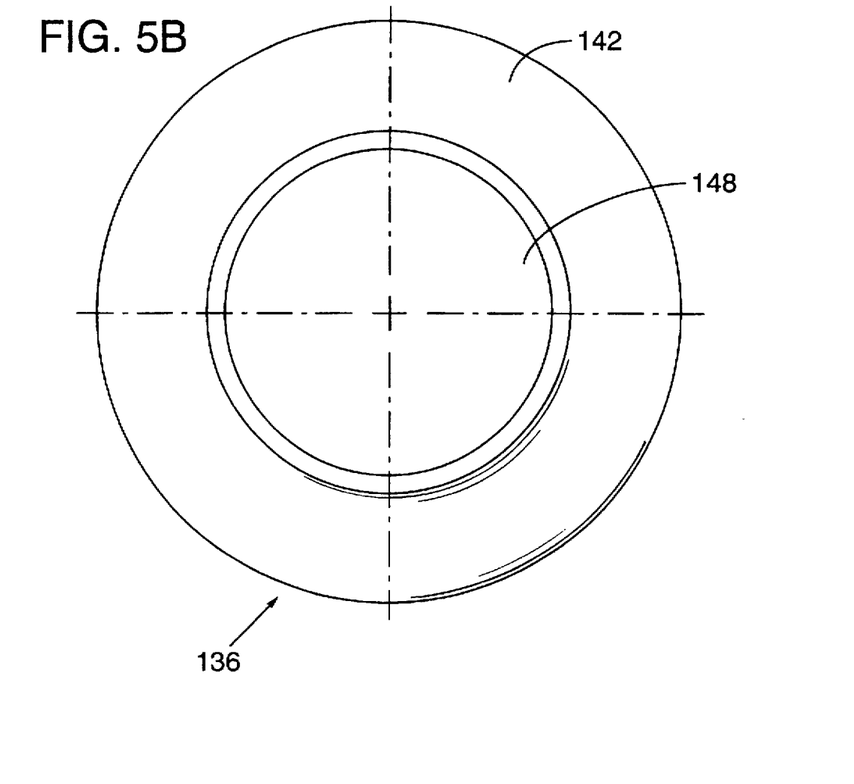

FIGS. 5A and 5B show rotary fluid slip ring 136, which is fitted into each of the rotary joints at shoulder axis 16, elbow axis 24, and wrist axis 32. For purposes of convenience only, the following describes the operation of slip ring 136 in the rotary joint defining wrist axis 32.

With reference to FIGS. 4A, 4B, 5A, and 5B, slip ring 136 includes a convex upper surface 142 and a convex lower surface 144 separated by an annular leaf spring 146. Each of surfaces 142 and 144 is preferably made of a reinforced Teflon® co-polymer and has a central aperture 148. When it is fitted in a rotary joint, slip ring 136 receives through central aperture 148 a protrusion 150 from the top surface of post 84 that extends from distal end 26 of forearm 22. Protrusion 150 has a hole 152 that extends into and through post 84 along its entire length and is in fluid communication with vacuum path segment 132 within forearm 22. The wrist joint formed by forearm 22 and hand 30 causes upper surface 142 to fit against an interior vacuum channel surface 154 of hand 30 and lower surface 144 to fit against a depression 156 in the top surface of post 84. The raised upper and lower surfaces 142 and 144 compress against leaf spring 146 and form a vacuum seal for the space between the top of protrusion 150 and vacuum channel surface 154 of hand 30. The reinforced co-polymer material from which upper surface 142 is made forms a bearing surface that maintains a vacuum-tight seal during rotary motion about wrist axis 32.

The mechanical construction of robot arm mechanism 10 does not restrict hand 30 to straight line motion but provides two degrees of freedom to achieve complex trajectories. This is beneficial because it facilitates specimen processing layouts to provide relatively small footprints and processing component placements that enhance ergonomic loading of specimens. A common application is to access specimens in straight line rather than complex hand movements. Thus, the following description gives an example of how a skilled person would implement controller 54 to carry out this common specimen access operation.

FIG. 6A is a diagram that specifies a local coordinate axis frame whose axes are defined by the orientation of a semiconductor wafer cassette 168, and its location relative to shoulder axis 16. With reference to FIG. 6A, the following description sets forth the mathematical expressions from which are derived the command signals controller 54 uses to retrieve from cassette 168, a wafer 170, along a vector perpendicular to the opening of cassette 168,.

The following parameters are pertinent to the derivation of the path of travel of hand 30:

$\theta_S$=angle of motor 52

$\theta_E$=angle of motor 50 r=distance between shoulder axis 16 and elbow axis 24 and distance between elbow axis 24 and wrist axis 32

$\beta$=angle between upper arm 14 and forearm 22 p=length of hand 30

E=2r=extension of robot arm $R_i$=reach of robot arm (i.e., its radius measured from shoulder axis 16 to the center 172, of wafer 170, positioned on hand 30).

Application of the law of cosines provides the following expressions for $R_i$:

$$R_i = p + \sqrt{(r^2 + r^2 - 2r^2\cos\beta)} \quad (1)$$
$$= p + \sqrt{2}\ r\sqrt{(1-\cos\beta)}\ .$$

For $\beta$=0, equation (1) provides that $R_i$=p and x=0, y=0, $\theta_S=\theta_{S_R}$, $\theta_E=\theta_{E_R}$. The quantities $\theta_{S_R}$ and $\theta_{E_R}$ represent reference motor angles. The motor angles may be expressed as $\theta_S=\theta_{S_R}+\Delta\theta_{S_R}$, $\theta_E=\theta_{E_R}+\Delta\theta_{E_R}$. The angle $\beta$ may be expressed as $\beta=2(\Delta\theta_{S_R}-\Delta\theta_{E_R})$ because of the construction of the mechanical linkages of robot arm mechanism 10. This equation relates the angle $\beta$ to changes in the motor angles.

To retrieve wafer 170, from cassette 168, along a straight line path, the displacement along the X-axis equals $X_0$, which is a constant. Thus, $X(t)=X_0$. The quantity $X(t)$ can be expressed as a function of the lengths of the X-axis components of its links:

$$X(t) = r\cos\theta_1 + r\cos\theta_2 + p\cos\theta_p, \quad (2)$$

in which $\theta_1$=angle of upper arm 14

$\theta_2$=angle of forearm 22

$\theta_p$=angle of hand 30.

Because upper arm 14 and forearm 22 are of the same length (r), $\theta_1$ tracks the angle $\theta_S$ of motor 52, and hand 30 moves in a straight line, the following expressions hold:

$$\theta_1 = \theta_S$$
$$\theta_2 = \theta_1 + \pi - \beta$$

$$\theta_p = \theta_1 + \left(\frac{\pi - \beta}{2}\right).$$

Thus, to compute $X_0$, one substitutes the foregoing identities for $\theta_1$, $\theta_2$, and $\theta_p$ into equation (2) for X(t) and finds:

$$X_0 = r(\cos\theta_1 + \cos\theta_2) + p\cos\theta_p \quad (3)$$

$$X_0 = r(\cos\theta_1 + \cos(\theta_1 + \pi - \beta)) + p\cos\left(\theta_1 + \frac{\pi}{2} - \frac{\beta}{2}\right)$$

$$X_0 = r(\cos\theta_1 - \cos(\theta_1 - \beta)) - p\sin\left(\theta_1 - \frac{\beta}{2}\right).$$

Equation (3) expresses the constraint that sets out the relationship between the angles $\theta_S$ and $\theta_E$ of motors 52 and 50 operating to move equal angular distances to achieve straight line movement of hand 30.

Skilled persons can implement constraint equation (3) by means of a servomechanism controller in any one of a number of ways. For example, to achieve high speed operation to implement a given wafer move profile, one can compute from equation (3) command signal values and store them in a look-up table for real-time use. The precomputation process would entail the indexing of $\theta_S$ in accordance with the wafer move profile and determining from equation (3) the corresponding $\theta_E$ values, thereby configuring the displacement of $\theta_S$ and $\theta_E$ in a master-slave relationship.

To achieve angular displacement of hand 30 about shoulder axis 16, controller 54 causes motors 50 and 52 to rotate in the same direction through the desired angular displacement of hand 30 to reach the desired destination. The linear extension of hand 30 does not change during this move. Skilled persons will appreciate that complicated concurrent linear and angular displacement move profiles of hand 30 could be accomplished by programming controller 54 to operate motors 50 and 52 through different angular displacements. FIG. 6A shows a second wafer cassette 168, positioned so that the center 172, of a stored wafer 170, is coincident to $Y_0$. The parallel arrangement of the openings of cassettes 168, and 168, demonstrates that the above expressions can be used to retrieve wafers stored in cassettes not positioned a radial distance from shoulder axis 16. Such nonradial placement is not implemented in the prior art references described above. Robot arm mechanism 10 is not restricted to radial placement, but can accommodate any combination of distances within its reach.

FIG. 6B is a simplified block diagram showing the primary components of controller 54. With reference to FIG. 6B, controller 54 includes a program memory 174 that stores move sequence instructions for robot arm mechanism 10. A microprocessor 176 receives from program memory 174 the move sequence instructions and interprets them to determine whether the first or second operational state is required. A system clock 178 controls the operation of microprocessor 176. A look-up table (LUT) 180 stores corresponding values for $\theta_S$ (motor 52) and $\theta_E$ (motor 50) to accomplish the straight line motion of the first operational state and the angular displacements of $\theta_S$ and $\theta_E$ to accomplish the angular motion of the second operational state.

Microprocessor 176 provides $\theta_S$ and $\theta_E$ position signals to a servomechanism amplifier 182, which delivers $\theta_S$ and $\theta_E$ command signals to motors 52 and 50, respectively. Servomechanism amplifier 182 receives from glass scale encoders 106 and 108 signals indicative of the angular positions of the respective motors 50 and 52.

Microprocessor 176 also provides control signals to a vacuum valve controller 184, which causes a vacuum valve (not shown) to provide from a vacuum source (not shown) an appropriate amount of vacuum pressure to outlet 36 in response to the need to hold a wafer on or release a wafer from hand 30.

Figure 7A:
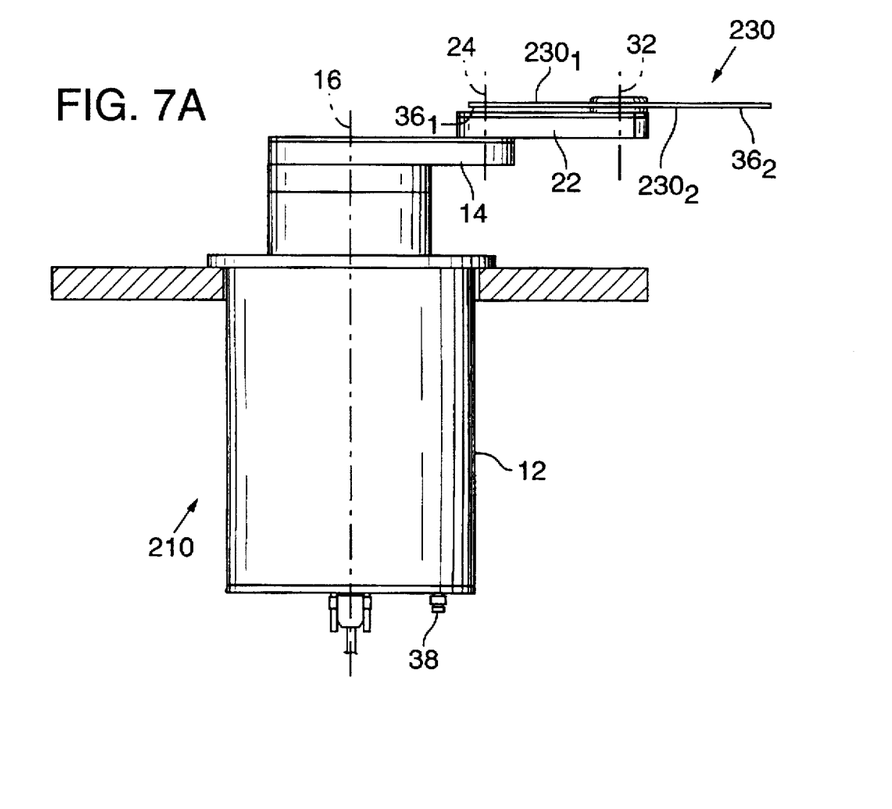
FIGS. 7A and 7B are respective side elevation and plan views of an alternative three-link robot arm mechanism having an end effector structure with two oppositely extending hands.
Figure 7B:
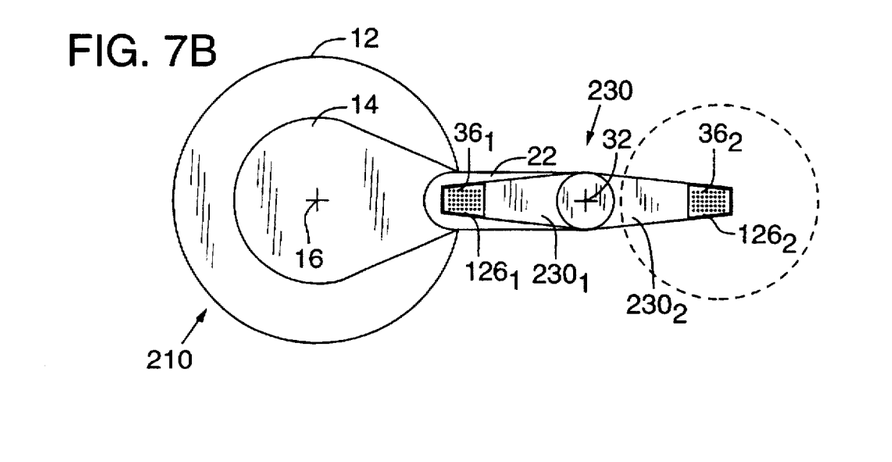
Figure 8A:
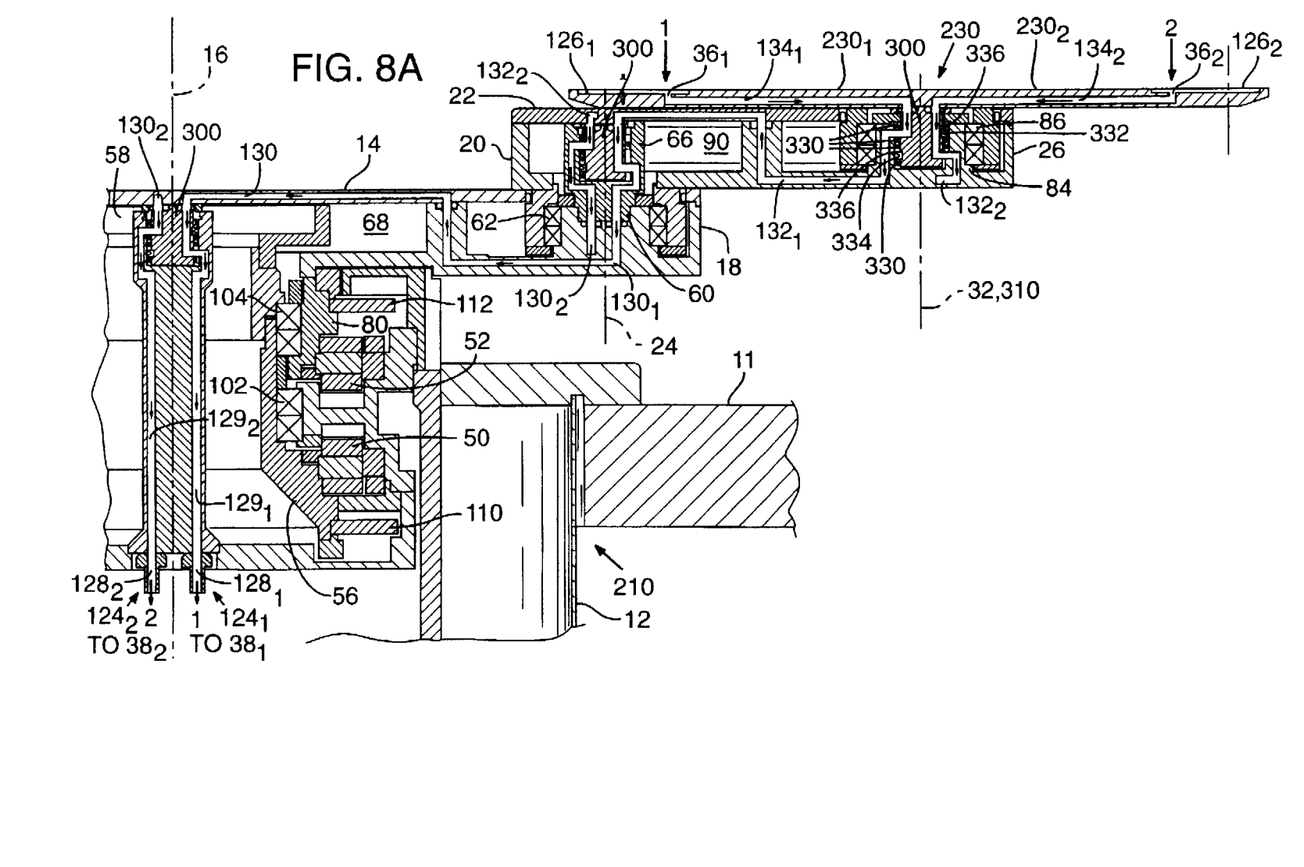
FIGS. 8A and 8B are respective fragmentary cross-sectional and plan views showing the interior components, mechanical linkage, and fluid pressure line paths of the robot arm mechanism of FIGS. 7A and 7B.
Figure 8B:
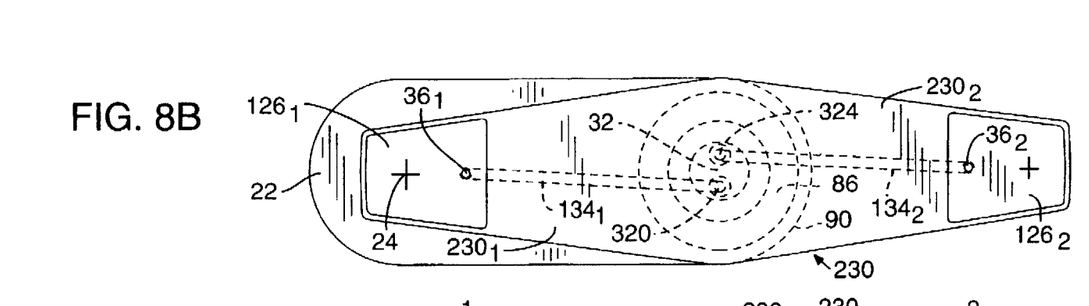

FIGS. 7A and 7B show an alternative three-link robot arm mechanism 210 of similar design to robot arm mechanism 10 with a significant exception that an end effector structure 230 having two oppositely extending hands $230_1$ and $230_2$ is substituted for hand 30. FIGS. 8A and 8B show the interior components, mechanical linkage, and vacuum pressure line paths of robot arm mechanism 210. Because of the similarity of robot arm mechanisms 10 and 210, their correspondin9 components are identified by identical reference numerals.

With reference to FIGS. 7A and 7B, end effector structure 230 includes oppositely extending hands $230_1$ and $230_2$ that rotate about wrist axis 32. Because they retrieve and deliver separate specimens, hand $230_1$ has a vacuum land $126_1$ with an outlet $36_1$ and hand $230_2$ has a vacuum land $126_2$ with an outlet $36_2$ that are connected to separate vacuum pressure conduits routed within base housing 12, upper arm 14, and forearm 22.

With reference to FIGS. 8A and 8B, robot arm mechanism 210 includes two separate vacuum pressure conduits $124_1$ and $124_2$ each including multiple path segments, with conduit $124_1$ extending between a vacuum pressure inlet $38_1$ and an outlet $36_1$ of vacuum land $126_1$ and conduit $124_2$ extending between a vacuum pressure inlet $38_2$ and an outlet $36_2$ of vacuum land $126_2$. Inlets $38_1$ and $38_2$, which for mechanism 210 are two ports in inlet 38 of FIG. 1, are connected to a manifold (not shown) to receive independently controlled vacuum pressure provided by a vacuum pressure source (not shown). Path segments $128_1$ and $128_2$ of the respective conduits $124_1$ and $124_2$ are flexible hoses. Path segments $129_1$ and $129_2$ in base housing 12, path segments $130_1$ and $130_2$ in upper arm 14, path segments $132_1$ and $132_2$ in forearm 22, and path segments $134_1$ and $134_2$ in the respective hands $230_1$ and $230_2$ are either channels formed by complementary depressions in mating components or holes passing through solid components.

Figure 9A:
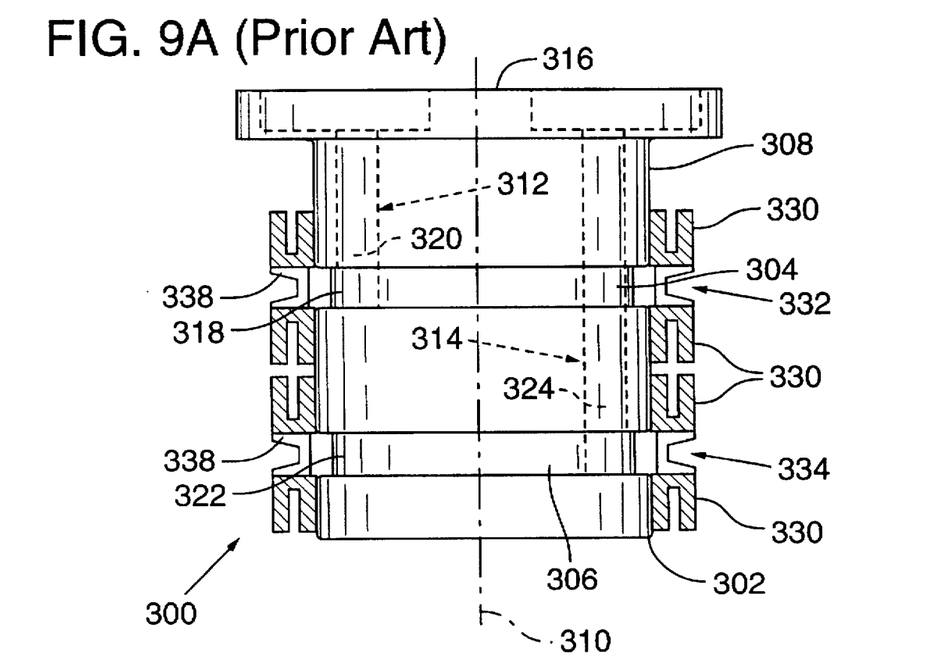
FIGS. 9A and 9B are respective side elevation and plan views of the rotary multiple fluid-passageway spool installed in each rotary joint of the robot arm mechanism of FIGS. 8A and 8B.
Figure 9B:
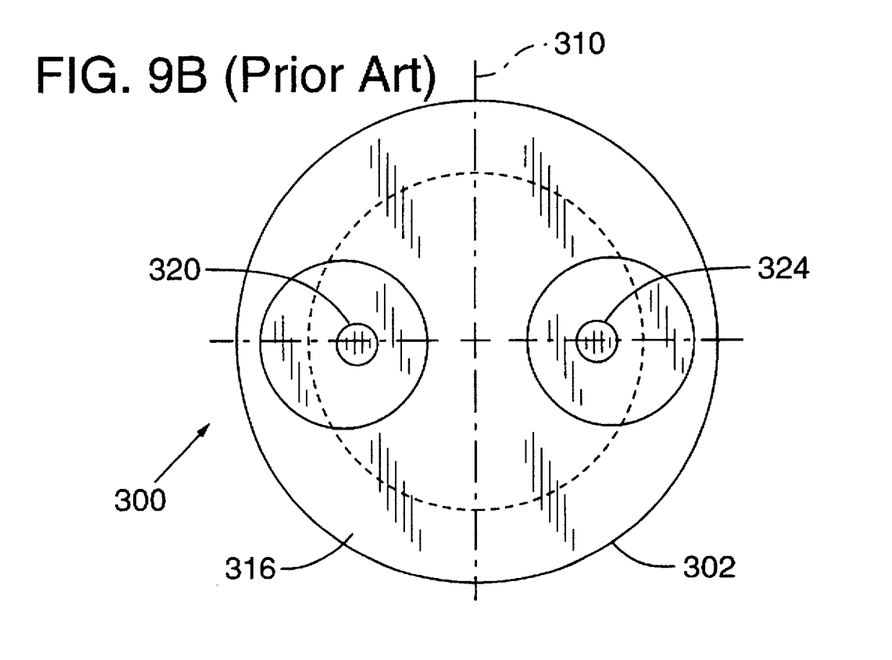

Outlets $36_1$ and $36_2$ constitute holes in the respective vacuum lands $126_1$ and $126_2$. Each path segment of conduits $124_1$ and $124_2$ terminating or originating at shoulder axis 16, elbow axis 24, and wrist axis 32 includes a rotary multiple fluid-passageway spool 300 that functions as two independent vacuum feedthrough conduits that permit continuous rotation about any one of these three axes. The placement of spool 300 fitted in each of the three rotary joints of robot arm mechanism 210 is shown in FIGS. 8A and 8B. FIGS. 9A and 9B show the design detail of a prior art rotary multiple fluid-passageway spool 300.

With reference to FIGS. 8A, 8B, 9A, and 9B, spool 300 comprises a solid metal cylindrical body 302 having two spaced-apart grooves 304 and 306 formed in and encircling its outer side surface 308 about a longitudinal axis 310. Two separate vacuum pressure delivery channels 312 and 314 are formed within and pass through body 302. (Comparison of FIGS. 8A and 8B with FIG. 93 reveals that vacuum pressure delivery channels 312 and 314 formed within body 302 by artistic license are drawn rotated by 90 degrees in FIG. 8A only to show clearly the vacuum pressure conduits.) Each of channels 312 and 314 has two passageway segments, one originating in a groove and the other terminating at a top surface 316 of body 302. More specifically, for channel 312, a passageway segment 318 extends inwardly from groove 304 in a direction transverse to longitudinal axis 310 and intersects with a passageway segment 320 at a right angle juncture. Passageway segment 320 extends upwardly toward and through top surface 316 in a direction parallel to longitudinal axis 310. Similarly, for channel 314, a passageway segment 322 extends inwardly from groove 306 in a direction transverse to longitudinal axis 310 and intersects with a passageway segment 324 at a right angle juncture. Passageway segment 324 extends upwardly toward and through top surface 316 in a direction parallel to longitudinal axis 310.

For purposes of convenience only, the following describes the operation of spool 300 in the rotary joint defining wrist 32. When spool 300 is fitted into forearm 22, four seal rings 330 spaced above, between (two seals), and below grooves 304 and 306 form two annular gas spaces 332 and 334 between side surface 308 of spool 300 and an interior surface 336 of forearm 22. Spacers 338 that extend about 330 degrees around spool 300 in grooves 304 and 306 maintain the desired separation between adjacent seal rings 330. Vacuum path segments $134_1$ and $134_2$ terminate in the respective gas spaces 332 and 334 and their corresponding holes in top surface 316 of spool 300, thereby coupling the vacuum pressure supply to and from spool 300.

Figure 10:
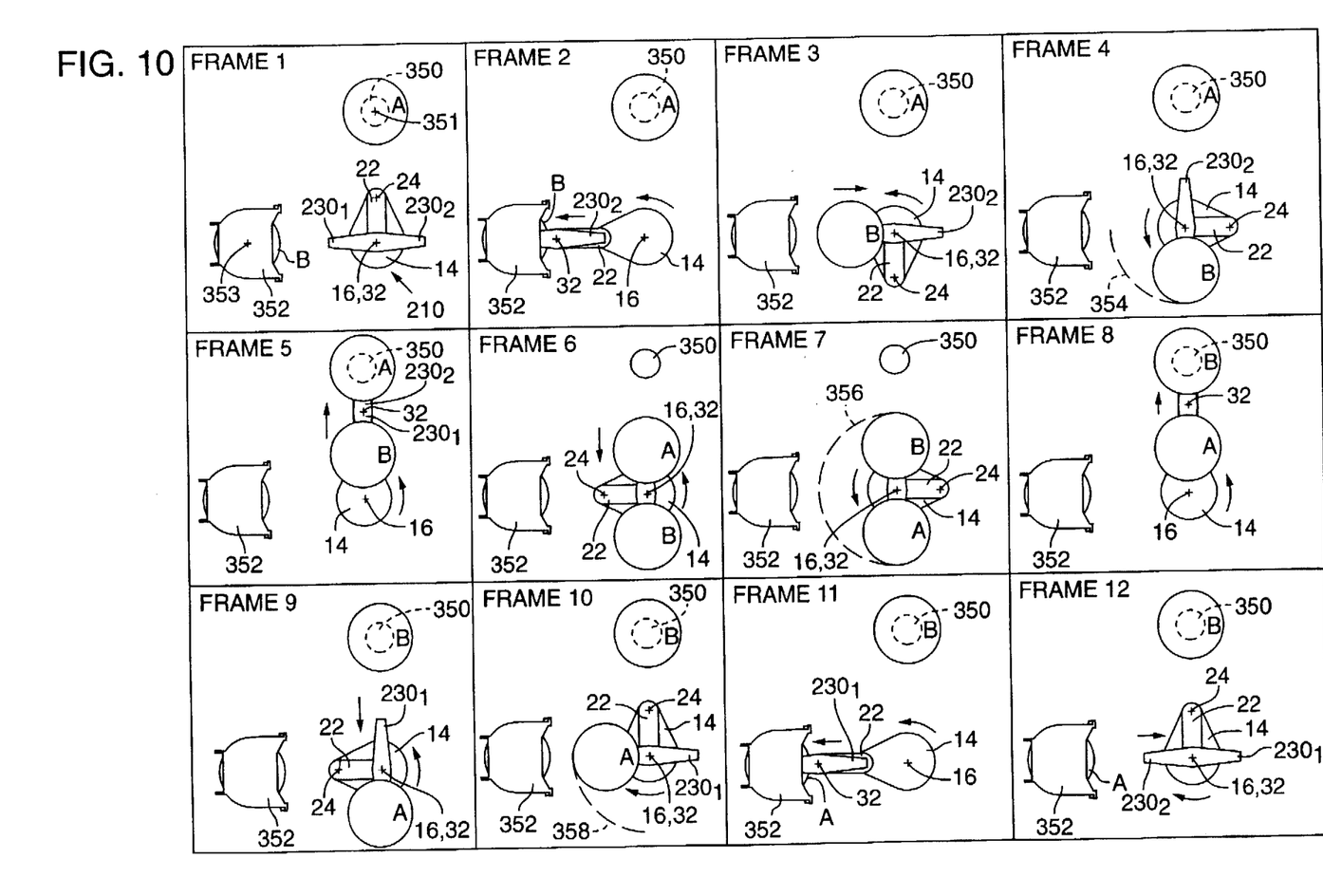
FIG. 10 shows in a series of 12 frames the various positions of a dual-hand embodiment of the three-link robot arm mechanism of FIGS. 7A and 7B as it sequentially exchanges the positions of two specimens initially located at separate process and storage locations.

FIG. 10 includes 12 frames showing various positions of end effector structure 230 in an exemplary operational sequence that exchanges positions of a wafer A initially located at a processing station 350 (such as a cooling platform) having an effective center 351 and a wafer B initially stored in a wafer cassette 352 having an effective center 353. In this example, the distances between shoulder axis 16 and effective centers 351 and 353 are the same and define a radial distance for robot arm mechanism 210. As was noted above with reference to FIG. 6A, the effective centers of the wafer cassettes need not be radially positioned relative to shoulder axis 16. The following description tracks the angular displacement of upper arm 14 about shoulder axis 16 to demonstrate the continuous rotation capability of the mechanical links in robot arm mechanism 210.

Frame 1 shows the initial position of hand $230_1$ retracted and in line with the opening of cassette 352.

Frame 2 shows upper arm 14 and forearm 22 cooperatively rotating in the first operational state of motor controller 54 to linearly extend hand $230_1$ so as to reach and retrieve wafer B. To accomplish this incremental movement, upper arm 14 rotated 90 degrees in a counter-clockwise direction about shoulder axis 16.

Frame 3 shows upper arm 14 and forearm 22 cooperatively rotating in the first operational state of motor controller 54 to linearly retract hand $230_1$ holding wafer B near the opening of cassette 352 after the application of vacuum pressure at outlet $36_1$ to secure wafer B to hand $230_1$. (Although it is retracted by an amount that aligns shoulder axis 16 and wrist axis 32, hand $230_1$, need be retracted only by an amount necessary to clear cassette 352.) To accomplish this incremental movement, upper arm 14 rotated 90 degrees in a counter-clockwise clockwise direction about shoulder axis 16, (if hand 230 had been retracted only so far as necessary to clear cassette 352, upper arm 14 would not have required a 90 degree rotation.)

The motion sequence presented by frames 1, 2, and 3 demonstrates the capability of the robot arm mechanism to travel "around the horn" in that it extends and retracts without retracing its path. This contrasts with the prior art systems described above. which must retrace because of hose kinking and lockout spaces.

Frame 4 shows upper arm 14 rotating 90 degrees in a counter-clockwise direction along a circular path segment 354 about shoulder axis 16 in the second operational state of motor controller 54 to keep hand $230_1$ retracted while holding wafer B. hold forearm 22 stationary, and position hand $230_2$ in line with processing station 350.

Frame 5 shows upper arm 14 and forearm 22 cooperatively rotating in the first operational state of controller 54 to linearly extend hand $230_2$ so as to reach and retrieve wafer A. To accomplish this incremental movement, upper arm 14 rotated 90 degrees in a counter-clockwise direction about shoulder axis 16 to complete the first continuous 360 degree cycle of counter-clockwise rotation of upper arm 14 during this operational sequence.

Frame 6 shows upper arm 14 and forearm 22 cooperatively rotating in the first operational state of controller 54 to linearly retract had $230_2$ holding wafer A in line with processing station 350 after the application of vacuum pressure at outlet $36_2$ to secure wafer A to hand $230_2$. To accomplish this incremental movement, upper arm 14 rotated 90 degrees in a counter-clockwise direction about shoulder axis 16.

Frame 7 shows upper arm 14 rotating 180 degrees in a counter-clockwise direction along a circular path segment 356 about shoulder axis 16 in the second operational state of controller 54 to keep hands $230_1$ and $230_2$ retracted while holding the respective wafers B and A. hold forearm 22 stationary, and position hand $230_1$ in line with processing station 350.

Frame 8 shows upper arm 14 and forearm 22 cooperatively rotating in the first operational state of controller 54 to linearly extend hand $230_1$ to deliver wafer B to processing station 350. To accomplish this incremental movement, upper arm 14 rotated 90 degrees in a counter-clockwise direction about shoulder axis 16 and thereby completed its second continuous 360 degree cycle of counter-clockwise motion during this operational sequence.

Frame 9 shows upper arm 14 and forearm 22 cooperatively rotating in the first operational state of controller 54 to linearly retract hand $230_1$ after the release of vacuum pressure at outlet $36_2$ to leave wafer B at processing station 350. To accomplish this incremental movement, upper arm 14 rotated 90 degrees in a counter-clockwise direction about shoulder axis 16.

Frame 10 shows upper arm 14 rotating 90 degrees in a clockwise direction along a circular path segment 358 about shoulder axis 16 in the second operational state of controller 54 to position hand $230_2$ holding wafer A in line with the opening of cassette 352. To accomplish this incremental movement, upper arm 14 counter-rotated 90 degrees in a clockwise direction about shoulder axis 16.

Frame 11 shows upper arm 14 and forearm 22 cooperatively rotating in the first operational state of controller 54 to linearly extend hand $230_2$ to deliver wafer A to cassette 352. To accomplish this incremental move, upper arm 14 rotated 90 degrees in a counter-clockwise direction about shoulder axis 16.

Frame 12 shows upper arm 14 and forearm 22 cooperatively rotating in the first operational state of controller 54 to linearly retract hand $230_2$ after the release of vacuum pressure at outlet $36_2$ to leave wafer A in cassette 352. To accomplish this incremental movement, upper arm 14 counter-rotated 90 degrees in a clockwise direction about shoulder axis 16.

In the example given above, upper arm 14 underwent bi-directional rotational movement and completed two continuous 360 degree cycles in a counter-clockwise direction about shoulder axis 16, with 810 degrees of continuous rotation in the counter-clockwise direction taking place before any clockwise counter-rotation. Thus, robot arm mechanism 210 is capable of continuous rotation without unwinding. The ability to continuously rotate in either direction and radially position end effector structure 230 provides a compact working space without lockout areas.

It will be obvious to those having skill in the art that many changes may be made to the details of the above-described embodiments of this invention without departing from the underlying principles thereof. The scope of the present invention should, therefore, be determined only by the following claims.

We claim:

1. A robot arm mechanism, comprising:

an upper arm supporting a forearm and a hand and operable for rotation about a shoulder axis; the forearm having a first end that is supported by the upper arm for rotation about an elbow axis and having a second end that supports the hand for rotation about a wrist axis; the upper arm, forearm, and hand constituting link elements through which a fluid pressure conduit passes to deliver vacuum pressure to releasably secure a specimen to the hand; and the shoulder axis, elbow axis, and wrist axis defining rotary joints through which the fluid pressure conduit passes;

a rotary fluid slip ring fitted into least one of the rotary joints, the rotary fluid slip ring having a central aperture through which vacuum pressure is delivered and having first and second surfaces that form a vacuum pressure seal at an interface between the link elements forming the rotary joint into which the slip ring is fitted;

a first motor for rotatably positioning the forearm about the elbow axis;

a second motor for rotatably positioning the upper arm about the shoulder axis;

a mechanical linkage operatively connecting the upper arm and the forearm, the mechanical linkage forming an active drive link between the first motor and the forearm to cause the forearm to rotate about the elbow axis in response to operation of the first motor and a passive drive link between the forearm and the hand to cause the hand to rotate about the wrist axis in response to rotation of the forearm about the elbow axis; and a controller coordinating the operation of the first and second motors in first and second states, the first state characterized by operating the second motor and holding stationary the first motor so that the mechanical linkage causes linear displacement of the hand and the second state characterized by operating the first and second motors so that the mechanical linkage causes angular displacement of the hand about the shoulder axis.

2. The robot arm mechanism of claim 1 in which the controller in the second state coordinates the operation of the first and second motors to provide essentially equal and opposite offsetting angular displacements of the upper arm about the shoulder axis and the forearm about the elbow axis that cause angular displacement of the hand about the shoulder axis but essentially no angular displacement of the hand about the wrist axis.

3. The robot arm mechanism of claim 2 in which the first and second motors rotate in the same direction.

4. The robot arm mechanism of claim 1 in which the controller in the first state causes a change in the linear extension of the hand by actuating the second motor to rotate the upper arm and thereby impart rotational motion to the forearm about the elbow axis and to the hand about the wrist axis to effect a straight line movement of the hand and in the second state causes angular displacement of the hand about the shoulder axis by actuating the second motor to rotate the upper arm and the first motor to rotate the forearm about the elbow axis so that the straight line movement imparted to the hand by the rotation of the upper arm is at least partly offset by straight line movement imparted to the hand by the rotation of the forearm.

5. The robot arm mechanism of claim 4 in which the first and second motors are coordinated to move in equal amounts so that the linear motions imparted to the hand by the rotations of the upper arm and the forearm are essentially completely offset.

6. The robot arm mechanism of claim 1 in which the controller in the second state coordinates the operation of the first and second motors to provide dissimilar angular displacements of the upper arm about the shoulder axis and of the forearm about the elbow axis that cause angular displacements of the hand about the shoulder and wrist axes and thereby describe a nonradial, straight line path of travel for the hand.

7. The robot arm mechanism of claim 1 in which the hand comprises one of two oppositely extending hands of an end effector structure that is operable for rotation about the wrist axis.

8. The robot arm mechanism of claim 1 in which the first motor includes a first spindle and the second motor includes a second spindle and in which the first and second motors are positioned in concentric relation such that their respective first and second spindles rotate about a common axis.

9. The robot arm mechanism of claim 8 in which the common axis constitutes the shoulder axis.

10. The robot arm mechanism of claim 8 in which the hand comprises one of two oppositely extending hands of an end effector structure that is operable for rotation about the wrist axis.

11. The robot arm mechanism of claim 1 in which the second motor includes a second spindle and is positioned so that the second spindle rotates about the shoulder axis, the second spindle being directly mechanically connected to the upper arm.

12. A robot arm mechanism, comprising:

an upper arm supporting a forearm and a hand and operable for rotation about a shoulder axis, the forearm having a first end that is supported by the upper arm for rotation about an elbow axis and having a second end that supports the hand for rotation about a wrist axis, and the shoulder axis, elbow axis, and wrist axis defining rotary joints for, respectively, the upper arm, the upper arm and forearm, and the forearm and hand;

a fluid pressure conduit passing through the upper arm, forearm, and hand to deliver vacuum pressure to releasably secure a specimen to the hand;

a first motor including a first spindle for rotatably positioning the forearm about the elbow axis and a second motor including a second spindle for rotatably positioning the upper arm about the shoulder axis, the first and second motors being positioned in concentric relation such that their respective first and second spindles rotate about a common axis;

a mechanical linkage operatively connecting the upper arm and the forearm, the mechanical linkage forming an active drive link between the first motor and the forearm to cause the forearm to rotate about the elbow axis in response to operation of the first motor and a passive drive link between the forearm and the hand to cause the hand to rotate about the wrist axis in response to rotation of the forearm about the elbow axis;

a rotary fluid slip ring fitted within the rotary joint defined by the elbow axis, the slip ring having a central aperture through which vacuum pressure is delivered and first and second surfaces that form a vacuum pressure seal between the upper arm and the forearm; and a controller coordinating the operation of the first and second motors so that the mechanical linkage causes linear displacement of the hand and angular displacement of the hand about the shoulder axis.

13. The robot arm mechanism of claim 12 in which the common axis constitutes the shoulder axis.

14. The robot arm mechanism of claim 12 in which the second spindle is directly mechanically connected to the upper arm.

15. The robot arm mechanism of claim 12 in which the hand comprises one of two oppositely extending hands of an end effector structure that is operable for rotation about the wrist axis.

16. The robot arm mechanism of claim 12 in which the upper arm is operatively connected to a base housing through which the shoulder axis passes and further comprising two additional rotary fluid slip rings, one of the two rotary fluid slip rings fitted within the rotary joint defined by the shoulder axis to form a vacuum seal between the base housing and the upper arm and the other rotary fluid slip ring fitted within the rotary joint defined by the wrist axis to form a vacuum seal between the forearm and the hand.

* * * * *